(12) United States Patent
Debevec et al.

(10) Patent No.: US 7,978,202 B2
(45) Date of Patent: *Jul. 12, 2011

(54) HIGH DYNAMIC RANGE IMAGE EDITING

(75) Inventors: Paul E. Debevec, Marina Del Rey, CA (US); Timothy S. Hawkins, Marina Del Rey, CA (US); Chris D. X. N. Tchou, Kirkland, WA (US)

(73) Assignee: University of Southern California, Los Angeles, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/347,782

(22) Filed: Dec. 31, 2008

(65) Prior Publication Data

US 2009/0303249 A1 Dec. 10, 2009

Related U.S. Application Data

(63) Continuation of application No. 11/049,834, filed on Feb. 1, 2005, now Pat. No. 7,486,299, which is a continuation of application No. 10/170,087, filed on Jun. 10, 2002, now Pat. No. 6,888,552.

(60) Provisional application No. 60/297,096, filed on Jun. 8, 2001, provisional application No. 60/297,397, filed on Jun. 11, 2001.

(51) Int. Cl.
*G09G 5/02* (2006.01)
(52) U.S. Cl. .................. 345/589; 345/605; 382/162
(58) Field of Classification Search .............. 382/162; 345/589, 605
See application file for complete search history.

(56) References Cited

U.S. PATENT DOCUMENTS

| 5,012,333 | A | 4/1991 | Lee et al. |
| 5,963,201 | A | 10/1999 | McGreggor et al. |
| 6,005,636 | A | 12/1999 | Westerman |
| 6,262,817 | B1 | 7/2001 | Sato et al. |
| 6,282,312 | B1 | 8/2001 | McCarthy et al. |
| 6,285,784 | B1 | 9/2001 | Spaulding et al. |
| 6,337,692 | B1 | 1/2002 | Rai et al. |
| 6,341,183 | B1 | 1/2002 | Goldberg |

(Continued)

FOREIGN PATENT DOCUMENTS

EP 0991019 4/2000

(Continued)

OTHER PUBLICATIONS

AdobePhotoshop 5.0, User Guide, Chapter 5, "Reproducing Color Accurately," pp. 79-101, Adobe Systems, Inc., published Jan. 1, 1998.

(Continued)

*Primary Examiner* — M Good Johnson
(74) *Attorney, Agent, or Firm* — McDermott Will & Emery LLP

(57) ABSTRACT

A high dynamic range image editing system for editing an image file having pixels spanning a first range of light intensity levels in an image editing system that only displays differences in the light intensity levels of pixels within a second range of light intensity levels that is less than the first range of light intensity levels, without reducing the range of light intensity levels in the image file.

28 Claims, 2 Drawing Sheets

U.S. PATENT DOCUMENTS

| | | | |
|---|---|---|---|
| 6,369,787 B1 | 4/2002 | Wu et al. | |
| 6,396,505 B1 | 5/2002 | Lui et al. | |
| 6,888,552 B2 * | 5/2005 | Debevec et al. | 345/589 |
| 6,943,831 B2 * | 9/2005 | Gallagher et al. | 348/222.1 |
| 7,068,396 B1 * | 6/2006 | Gallagher et al. | 358/3.01 |
| 7,486,299 B2 * | 2/2009 | Debevec et al. | 345/589 |
| 2002/0130957 A1 | 9/2002 | Gallagher et al. | |
| 2002/0135683 A1 | 9/2002 | Tamama et al. | |

FOREIGN PATENT DOCUMENTS

| | | |
|---|---|---|
| WO | 02101646 | 12/2002 |

OTHER PUBLICATIONS

Debevec et al., "Recovering High Dynamic Range Radiance Maps from Photographs," in Computer Graphics Proceedings SIGGRAPH 97, Aug. 3, 1997, pp. 369-378.

European Patent Application No. 02746496.5 (corresponding to PCT Publication No. WO/2002/101646), European Search Report, mailed Aug. 1, 2008.

European Patent Application No. 02746496.5 (corresponding to PCT Publication No. WO/2002/101646), European Examination Report, mailed Oct. 30, 2008.

European Patent Application No. 02746496.5 (corresponding to PCT Publication No. WO/2002/101646), European Communication Pursuant to EPC Article 94(3), mailed Oct. 6, 2010.

Ward, Greg, "Chapter II.5: Real Pixels," in Graphics Gems II, James Arvo, Editor, Morgan Kaufmann Publishing, San Francisco, 1991, pp. 80-83.

Ward Larson, Greg, "Overcoming Gamut and Dynamic Range Limitations in Digital Images," in Proceedings of the Color Imaging Conference: Color Science, Systems and Applications 1998, 1998, pp. 214-219.

* cited by examiner

FIG. 2

| Pixel | High Dynamic Range Image | | | Low Dynamic Range Image Editing System | | | | | |
|---|---|---|---|---|---|---|---|---|---|
| | Red | Blue | Green | Scaling = .001 | | Scaling = 1 | | Scaling = 1000 | |
| | | | | Intensity | Color | Intensity | Color | Intensity | Color |
| 1 | $1.23 \cdot 10^{-3}$ | $1.33 \cdot 10^{-3}$ | $1.41 \cdot 10^{-3}$ | 0 | -- | 0 | -- | 001 | 123461 |
| 2 | $2.34 \cdot 10^{-3}$ | $1.37 \cdot 10^{-3}$ | $1.43 \cdot 10^{-3}$ | 0 | -- | 0 | -- | 002 | 126311 |
| 3 | 1.23 | 1.33 | 1.41 | 0 | -- | 001 | 123461 | 255 | 123461 |
| 4 | 2.34 | 1.37 | 1.43 | 0 | -- | 000 | 126311 | 255 | 126311 |
| 5 | $1.23 \cdot 10^{3}$ | $1.33 \cdot 10^{3}$ | $1.41 \cdot 10^{3}$ | 001 | 123461 | 255 | 123461 | 255 | 123461 |
| 6 | $2.34 \cdot 10^{3}$ | $1.37 \cdot 10^{3}$ | $1.43 \cdot 10^{3}$ | 002 | 126311 | 255 | 126311 | 255 | 126311 |
| ... | ... | ... | ... | ... | ... | ... | ... | ... | ... |

HIGH DYNAMIC RANGE IMAGE EDITING

CROSS-REFERENCE TO RELATED APPLICATION(S)

This application is a continuation of U.S. application Ser. No. 11/049,834, filed Feb. 1, 2005, entitled "High Dynamic Range Image Editing," (now U.S. Pat. No. 7,486,299, issued Feb. 3, 2009); which is a continuation of U.S. application Ser. No. 10/170,087, filed Jun. 10, 2002 now U.S. Pat. No. 6,888,552, entitled "High Dynamic Range Image Editing,", which claims the benefit of the filing date of the following U.S. provisional applications: "HDR Shop," Application No. 60/297,096, filed Jun. 8, 2001, and "High Dynamic Range Image Processing System and Method," Application No. 60/297,397, filed Jun. 11, 2001.

STATEMENT REGARDING FEDERALLY SPONSORED RESEARCH

This invention was made with government support under Contract No. DAAD 19-99-D-0046 awarded by the Army Research Office (ARO). The government has certain rights in the invention.

The entire content of each and every one of the applications and patents identified above is incorporated herein by reference.

BACKGROUND

1. Technical Field

This invention relates to image editing systems and methods. More particularly, this invention relates to image editing systems and methods that work with images stored in digital format.

2. Description of Related Art

The "dynamic range" of a scene is the contrast ratio between its brightest and darkest parts. A plate of evenly lit mashed potatoes outside on a cloudy day has a very low dynamic range. The interior of an ornate cathedral with light streaming in through its stained-glass windows has a very high dynamic range. Scenes in which light sources can be seen directly also usually have a very high dynamic range.

As is well known, there are a variety of systems and methods that edit images. Examples of edit operations on images include: cropping, rotating, translating, convolving, cloning, retouching, painting or re-sampling.

In more recent times, computers have been used for image editing. The image is typically represented by a set of pixels. Each pixel is typically assigned values representing its color and intensity.

Unfortunately, most digital editing systems have a low dynamic range, meaning that the contrast ratio between the lightest and darkest pixel that they can display is small. In many systems, for example, there are only 256 distinct intensity levels that can be specified, e.g., from 0 to 255.

In the real world, on the other hand, there is no theoretical limit to the dynamic range of an image. Most images, moreover, have a dynamic range in excess of 100,000. Some have dynamic ranges in excess of 1,000,000. To be sure, most people are capable of distinguishing between dynamic ranges far, far in excess of the limited range of 255 that is found on many computer systems.

When a high dynamic range image is edited by a low dynamic range image editing system, the high dynamic range image is typically converted into an image file having the lower dynamic range of the image editing system. Important variations at very low intensities and at very high intensities are usually lost in the conversion process.

A still further problem with existing low dynamic range image editing systems is that the differences in assigned pixel intensity values often fail to bare a linear relationship to the differences in the intensity levels of the portions of the actual scene that these pixels represent. These non-linearities cause further distortions, in addition to the loss of information that occurs when a high dynamic range image is converted to the low dynamic range needed for the image editing system.

A still further problem with image editing systems is that the editing process is often slowed by repeated applications of a non-linear tone mapping curve or function, such as a gamma correction curve. As is well known, display systems are often adjusted to better match differences in the intensity levels of the real life image using a non-linear tone mapping curve or function, such as a gamma correction curve. Unfortunately, this typically involves complex computations that take significant time to compute during the editing process.

SUMMARY

One object of the invention is to obviate these as well as other problems in the prior art.

Another object of the invention is to facilitate the editing of a high dynamic range image with a low dynamic range image editing system without significant loss of dynamic range information.

A still further object of the invention is to provide an image editing system in which differences in intensity levels are substantially proportional to the differences in the actual scene illumination levels.

A still further object of the invention is to reduce delays in image editing systems caused by calculations of a non-linear tone mapping curve or function, such as a gamma correction curve.

A still further object of one embodiment of the invention is to obtain the advantages of the invention by making only slight modifications to standard low dynamic range image editing systems.

This as well as still further features, objects and benefits of the invention are obtained by a high dynamic range image editing system that edits an image file having pixels spanning a first range of light intensity levels with an image editing system that only displays differences in the light intensity levels of pixels within a second range of light intensity levels that is less than the first range of light intensity levels. A scaling control is operable by the user that allows the user to select one of several scaling factors. A scaler in communication with the scaling control creates a scaled version of the image file that has pixel intensity levels that are scaled from the original values in accordance with the selection made by the user on the scaling control.

The scaled version of the image file is preferably displayed. One or more image editing tools preferably edit the appearance of the image that is displayed on the display. These tools also edit the pixels in the image file in a manner that is consistent with the edits that are displayed, without reducing the range of light intensity levels in the image file.

In one embodiment, the intensity of each pixel in the image file is expressed as a floating point number. In a still further embodiment, the floating-point number is substantially proportional to the intensity represented by the pixel in the real image.

In a still further embodiment, the image file contains a red, green and blue pixel to represent each portion of the image, each pixel with its own intensity level.

In a still further embodiment, the scaler multiplies the selected scaling factor by the original values of the pixels in the high dynamic range image file.

In a still further embodiment, the scaling factors include one factor that is greater than one to brighten the image and another factor that is less than one to darken the image.

In a still further embodiment, a non-linear intensity adjuster, such as a gamma adjuster, adjusts the intensity curve of the image file in a non-linear manner. In one embodiment, a lookup table is included containing a plurality of intensity adjustment values, each mapped to one or more pixel intensities. In a still further embodiment, each intensity adjustment value is mapped to the value of the most significant bit of a pixel intensity value.

In a still further embodiment, the image editing tools include tools for cropping, rotating, convolving, cloning, retouching, painting and re-sampling.

In a still further embodiment, the scaling control is mapped to one or more keys on a keyboard. In an alternate embodiment, the scaling control is mapped to an area of the display that is selected by a mouse.

The invention also embraces the methods that are implemented by the systems described above.

The invention also includes computer-readable media containing computer-readable programming instructions which, when loaded and executed in a computer system, help create these systems and implement these methods.

The invention also includes computer-readable media containing an image file defined by a set of pixels, each pixel having an intensity value expressed as a mantissa and an exponent. In one embodiment, each pixel has a separate value for its red, blue and green components.

These, as well as other components, steps, features, objects, benefits, and advantages, will now become clear from a review of the following detailed description of illustrative embodiments, the accompanying drawings, and the claims

BRIEF DESCRIPTION OF DRAWINGS

FIG. 2 is a table setting forth typical values of various pixels in connection with the embodiment of the invention shown in FIG. 1.

Figure 1:
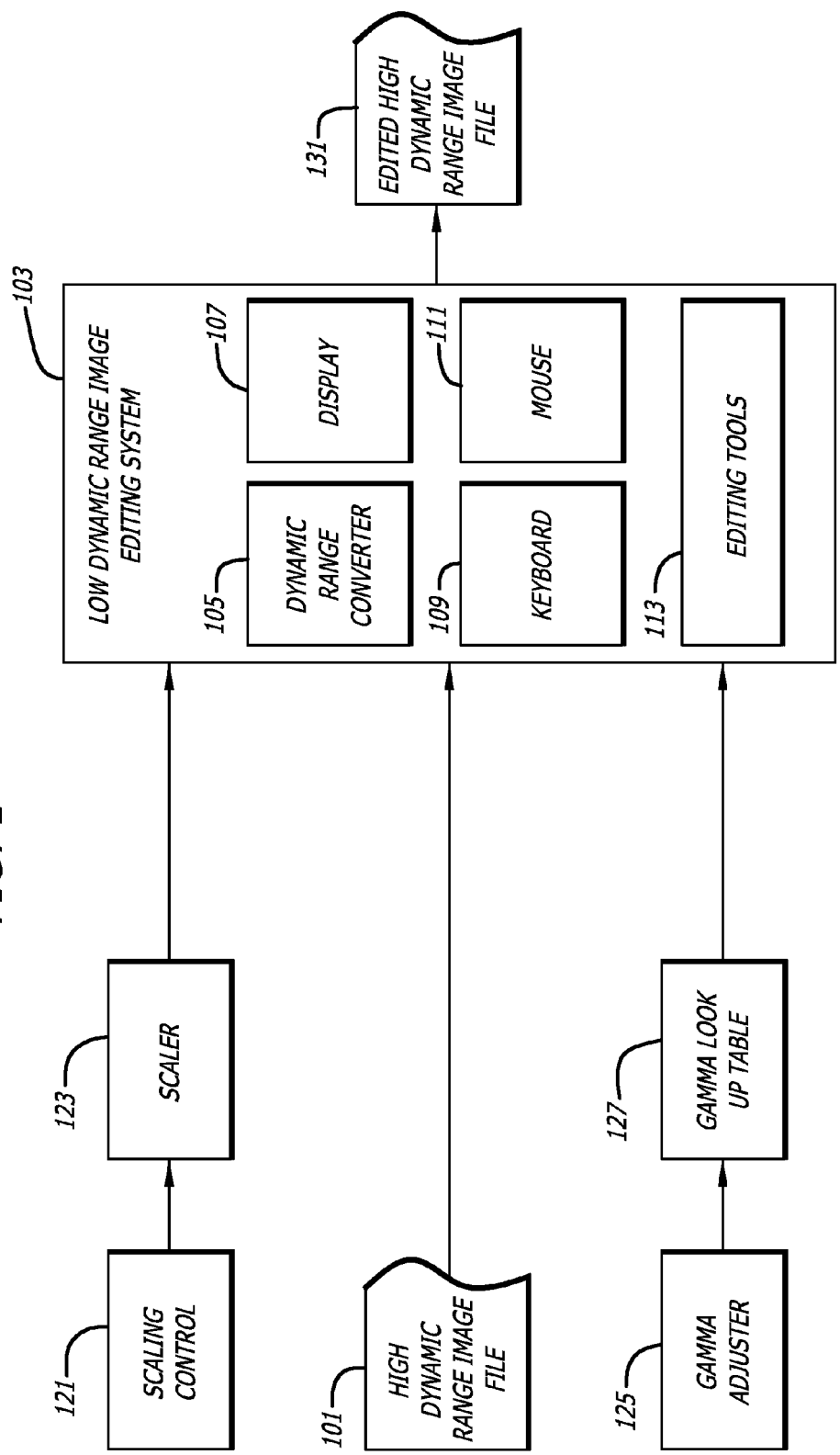
FIG. 1 illustrates certain components of one embodiment of the invention.

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

FIG. 1 illustrates certain components of one embodiment of the invention.

As shown in FIG. 1, a high dynamic range image file 101 is processed by an image editing system 103. The image editing system 103 includes a dynamic range converter 105, a display 107, a keyboard 109, a mouse 111 and image editing tools 113.

A user-operable scaling control 121 is in communication with a scaler 123 which, in turn, is in communication with the image file 101 and the image editing system 103. A gamma adjuster 125 is in communication with a gamma lookup table 127 that is in communication with the image editing system 103.

The image editing system 103 is intended to represent any of the image editing systems that are now known or hereinafter created. At least some aspect of the image editing system 103 will typically be limited to a dynamic range that is less than the dynamic range of the image file 101.

The "dynamic range" of an image is the contrast ratio between its brightest and darkest parts. In the real world, there is no theoretical limit on this ratio. A plate of evenly lit mashed potatoes outside in a cloudy day will have a very low dynamic range. The interior of an ornate cathedral with light streaming in through its stained-glass windows, on the other hand, will have a very high dynamic range. Scenes in which the light sources can be directly seen will also usually have a very high dynamic range.

By way of comparison, the dynamic range of the display system in many image editing systems today is merely 0-255. In sharp contrast, many real-life scenes have a dynamic range from 0-100,000, 0-1,000,000, and even greater.

There are numerous reasons for the low dynamic range of many existing image editing systems. These include limitations in the number of bits that the system works with to specify intensity and/or limitations in display systems that they use.

In a typical prior art system, a high dynamic range image file is converted to lower dynamic range image data that the image editing system can handle. Changes are then typically made to the lower dynamic range image data by the editing tools of the low dynamic range image editing system. The results of the edits are then typically stored as a low dynamic range image file, thus resulting in substantial loss of image intensity information.

The invention takes a different approach. The scaling control 121 allows the user of the image editing system to input or select one of several scaling factors. The inputted or selected scaling factor is then preferably multiplied by the value of the intensity of each pixel in the high dynamic range image file 101 by the scaler 123. The scaled image data is then converted by the dynamic range converter 105 into low dynamic range image data. In one embodiment, the low dynamic range image data is then processed by the editing tools 113.

The editing process, of course, is typically facilitated through commands entered into the keyboard 109 and through use of the mouse 111. Intermediate as well as final editing results are typically displayed on the display 107.

FIG. 2 is a table setting forth typical values of pixels in connection with the embodiment of the invention shown in FIG. 1. Six illustrative pixels (numbers 1 through 6) are shown in the rows of the table in FIG. 2. In a preferred embodiment of the invention, the intensity level of the each pixel is stored as a number in scientific notation containing a mantissa and an exponent.

With respect to pixel 1 in the table of FIG. 2, for example, and as shown in the column titled "High Dynamic Range Image Intensity," the intensity level is stored as $1.23*10^{-3}$.

In one embodiment of the invention, each number that represents an intensity level is actually stored in the IEEE floating point format. This format is:

SEEEEEEEEMMMMMMMMMMMMMMMMMMMMMMM

In this example, the most significant "S" bit represents the sign; the 8 "E" bits represent the exponent value; and the 23 "M" bits represent the mantissa value. In one embodiment, the sign "S" bit is advantageously utilized to effectively double the number of distinguishable values that are stored in the field. The value of the intensity level stored in this format would then be:

$$(-1)^{S} * 1.MMMMMMMMMMMMMMMMMMMMMMM * 2^{EEEEEEEE}$$

Of course, it is to be understood that a vast array of different formats can also be used to store the intensity values. For example, a different number of bits could be used to store the exponent and mantissa values. The sign bit could also be eliminated. In addition, a common exponent could be used for each of the color values of the pixel.

The columns of the table in FIG. 2 under the heading "Low Dynamic Range Image Intensity" represent the corresponding values of each pixel after they have been scaled with the scaler 123 using five different scaling factors that are generated by the scaling control 121 and after they have been converted with the dynamic range converter 105. The resulting intensities after the dynamic range converter 105 converts the high dynamic range image file 101 is shown in the center column under the "Low Dynamic Range Image Intensity" section.

When the scaling=1, subtle differences in the intensity of dark images (pixels 1 and 2) are completely lost, all of these differing intensities being converted to the same "0" value. Similarly, subtle differences among high intensity values (pixels 5 and 6) are also lost, these differing values all being converted to the same number "255." Differences in the midrange intensity values (pixels 3 and 4), on the other hand, are partially retained.

When the scaling=0.001, on the other hand, the high dynamic range image is darkened. Differences at very high intensity levels (pixels 5 and 6) are not lost and are now displayed as visible differences in intensity.

Conversely, when the scaling=1,000, the high dynamic range image is substantially brightened, resulting in the display of differences among the very low intensity pixels (pixels 1 and 2).

The scaling control can also be used advantageously, even when there are differences in the intensity values in the low dynamic range image data. Pixels 3 and 4 in FIG. 2, for example, have different intensity values in the low dynamic range image data. However, they both are so far at the bottom of the scale that, as a practical matter, they both are likely to indistinguishably appear on the display as black without any scaling. By scaling these pixels by a factor of 10, their values move more into the range of values that are likely to appear distinguishable on the display.

As will now be apparent to the skilled artisan, there are a broad variety of embodiments that the various components of the invention and process steps could take.

The scaling control 121, for example, could be one or more keys on the keyboard, such as the "+" and "−" keys. Alternatively, it could be an area on the screen that is selected or controlled by a mouse, keyboard or other input device. When a display is used, the available scaling factors could be presented in a list or the desired factor could simply be directly entered into a fill-in box or other area on the screen.

When keys on the keyboard are used as the scaling control 121, successive depressions of one key (e.g., the "+") key might cause the value to be incremented, while successive depressions of another key (e.g., the "−") key might cause the value to be decrement. The value of each increment and decrement might be linear, logarithmic, or in accordance with any other type of function. Minimum and/or maximum values for the scaling factors might also be imposed by the system.

In one embodiment, the scaler 123 multiplies the scaling factor created by the scaling control 121 by the intensity values of the pixels in the high dynamic range image file 101 on a pixel-by-pixel basis, including, as is commonly the case, the value of each of the red, blue and green channels. In alternate embodiments, other types of functional computations (e.g., addition or subtraction) could be performed.

As explained above, the scaled image data is then delivered to the dynamic range converter 105. As is well known in the art, this is a subsystem that typically truncates less significant digits in the intensity values so as to cause the resulting data to fit within the low dynamic range of the image editing system. As illustrated in the Scaling=1 section of FIG. 2, small differences between very low intensity values and very high intensity values are typically lost in this process. All of the very low intensity values are typically assigned to the same very low intensity value. All of the differing very high intensity values are typically assigned to the same single high intensity value.

When the high dynamic range image data from the high dynamic range image file 101 is scaled in accordance with the invention, however, this normal result is significantly altered. When a very large scaling factor is applied, for example, small differences between very low intensity values are effectively amplified, effectively increasing the exposure level of the image and, in turn, allowing these differences to fall within the scope of differences that the low dynamic range image editing system can manipulate and/or display. Conversely, when a very small scaling factor is applied, small differences between very high intensity values are effectively darkened, effectively decreasing the exposure level of the image and, in turn, allowing these differences to again fall within the scope of differences that the low dynamic range image editing system can manipulate and/or display.

The dynamic range converter 105 is simply a convenient name chosen for the conversion system. Typically, this is implemented with a combination of software and hardware. Pure software or pure hardware implementations may also be made.

The display 107 is intended to designate any type of device that can visually illustrate differences in intensity levels of pixels to the user of the scaling control 121. This would of course include CRTs, LCDs and even printers.

The keyboard 109 and the mouse 111 are merely two forms of input devices that are used to control the image editing system, as well as, in certain embodiments, the scaling control 121. Of course, other types of input devices, including data communicated from other computers or devices are also contemplated.

The image editing tools 113 are the image editing tools that typically are provided with image editing systems, as well as others. As is well known, such tools typically include tools that can crop the image, resample the image, rotate the image, translate the image, and apply convolutions to the image. They also include filtering tools, touch-up tools, cloning, retouching, painting etc. As is well known, these are typically implemented through software using mathematical computations. All types of image editing tools are contemplated.

As the editing on the low dynamic range image data proceeds in one embodiment, the edited image is typically displayed on the display 107. Although preferred, this is not a necessary step.

After each edit is made (or after the editing is completed) in one embodiment of the invention, each pixel in the original high dynamic range image file that had its corresponding pixel edited in the low dynamic range image file is replaced by the corresponding edited value from the low dynamic range image range file, scaled by a factor that is the inverse of the scaling factor used to create the low dynamic range image file. As a result of this process, the edited high dynamic range image file 131 retains the full high dynamic range of the original image file 101, plus the edits.

In one embodiment of the invention, a standard off-the-shelf low dynamic range image editing system can be readily adopted to implement the invention. In this event, software merely needs to be added to scale the high dynamic range image file in accordance with the user-settable scaling factor (e.g., using the scaling control 121 and scaler 123 in FIG. 1) and to convert the scaled image to the lower dynamic range needed by the low dynamic range image editing system (e.g., using the dynamic range converter 105 shown in FIG. 1). The scaled and converted low dynamic range image file is then edited by the editing tools and displayed as needed. Additional software must also then be added to replace each all-pixel in the high dynamic range image file that has been edited in the low dynamic range image with its corresponding edited version, scaled by the inverse of the scaling factor that was used.

In another embodiment of the invention, the editing tools are capable of directly editing the high dynamic range image file, but the display system may only be capable of displaying a lower dynamic range image. In this embodiment, a scaler (e.g., the scaler 121 in FIG. 1) scales all or only a desired portion of the high dynamic range image file based on the scaling factor generated by a user-operable scaling control (e.g., the scaling control in FIG. 1) to create a lower dynamic range image file. The lower dynamic range image file is then delivered to the display system and is displayed while the editing tools edit the high dynamic range image file directly.

Another feature of the invention relates to non-linear tone mapping curves or functions, such as gamma correction. As is well known, the gamma curve of many image editing systems does not match the intensity dynamics of the actual scene. To compensate, non-linear tone mapping curves or functions, such as gamma curve adjustments, are traditionally made, typically by hardware, software or a combination of both.

In one embodiment of the invention, a non-linear adjuster, such as a gamma adjuster 125, is provided for this purpose. As with the scaling control 121, this can be implemented through keystroke commands, mouse commands, or in any other way.

In the past, non-linear tone mapping curve or function adjustments, such as gamma adjustment compensation, were typically implemented by performing mathematical computations on each pixel. Unfortunately, this approach was often very demanding on processor time, slowing the editing process.

The invention helps reduce this problem by including an adjustment lookup table, such as a gamma lookup table 127. The gamma lookup table 127 maps pixel intensity values to gamma-adjusted pixel intensity values, thus obviating the need to perform any calculations. Instead, the pixel intensity value is simply looked up in the table to find its corresponding gamma-adjusted value.

The amount of correction that is specified by the gamma adjuster 125, of course, will affect the data that is populated in the gamma look-up table 127. In one embodiment, the adjustment data can be obtained through standard computational techniques and then stored just once in the lookup table 127. In this way, the adjusted value for pixels of the same intensity need not be recalculated each time.

To further economize on processing time and the size of data storage, the gamma look-up table can merely contain mapped values for ranges of pixel intensities, rather than for every single conceivable pixel intensity. In one embodiment, pixel intensities are only mapped for the high order bits of the word that is storing the pixel intensity value.

As indicated, the gamma correction apparatus and methods of the invention are equally applicable to other types of non-linear tone mapping curves or functions.

The software that is used to implement features of the invention can conveniently be stored in computer-readable media which, when loaded into a computer system, will cause that system to implement systems and methods of the invention. Such media can include CD ROMS, floppy disks, tapes, etc.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A high dynamic range image editing system for editing a high dynamic range image data having pixels spanning a first range of light intensity levels, the high dynamic range image editing system comprising:
   a scaling control operable by the user that allows the user to specify one of several scaling factors;
   a scaler in communication with the scaling control configured to create a scaled version of the image data that has pixel intensity levels that are scaled from their original values in accordance with the scaling factor specified by the user on the scaling control;
a display configured to display the scaled version of the image data which only displays differences in light intensity levels of pixels within a second range of light intensity levels which is less than the first range of light intensity levels; and
an image editing sub-system configured to:
edit the image in accordance with a request received from a user by editing pixels in the high dynamic range image data in accordance with the request; and
cause the scaled version and its display by the display to be updated with the edits that are made to the high dynamic range image data substantially concurrent with the edits that are made to the high dynamic range image data.

2. The high dynamic range image editing system of claim 1 wherein the scaler is configured to multiply the values of the pixels in the high dynamic range image data by the scaling factor specified by the user on the scaling control.

3. The high dynamic range image editing system of claim 2 wherein one of the several scaling factors is greater than one and one of the several scaling factors is less than one.

4. The high dynamic range image editing system of claim 1 further including a lookup table which maps pixel intensity values to adjusted pixel intensity values in accordance with a non-linear mapping curve.

5. The high dynamic range image editing system of claim 4 wherein the lookup table only maps pixel intensity values for the high order bits of words that store pixel intensity values, rather than all possible pixel intensity values.

6. A high dynamic range image editing process for editing an image contained within a high dynamic range image data having pixels spanning a first range of light intensity levels, the high dynamic range image editing process comprising:
a scaling control receiving one of several scaling factors specified by the user on the scaling control;
a scaler creating a scaled version of the image data that has pixel intensity levels that are scaled from their original values in accordance with the scaling factor specified by the user on the scaling control;
displaying the scaled version of the image data on a display which only displays differences in light intensity levels of pixels within a second range of light intensity levels which is less than the first range of light intensity levels;
an image editing sub-system:
editing the image in accordance with a request received from a user by editing pixels in the high dynamic range image data in accordance with the request; and
causing the scaled version and its display by the display to be updated with the edits that are made to the high dynamic range image data substantially concurrent with the edits that are made to the high dynamic range image data.

7. The high dynamic range image editing process of claim 6 wherein the creating a scaled version multiplies the value of the pixels in the high dynamic range image data by the scaling factor specified by the user on the scaling control.

8. The high dynamic range image editing process of claim 7 wherein one of the several scaling factors is greater than one and one of the several scaling factors is less than one.

9. The high dynamic range image editing process of claim 6 further including looking up pixel intensity values in a lookup table to obtain their adjusted pixel intensity values that correspond to a non-linear mapping curve.

10. The high dynamic range image editing process of claim 9 wherein the lookup table only maps pixel intensity values for the high order bits of words that store pixel intensity values, rather than all possible pixel intensity values.

11. Non-transitory, tangible, computer-readable storage media containing computer-readable programming instructions configured to enable a computer system to implement the process of claim 6 when loaded and executed within the computer system.

12. The computer-readable storage media of claim 11 wherein the computer-readable instructions are further configured to enable the computer system to implement the process of claim 7 when loaded and executed within the computer system.

13. The computer-readable storage media of claim 12 wherein the computer-readable instructions are further configured to enable the computer system to implement the process of claim 8 when loaded and executed within the computer system.

14. The computer-readable storage media of claim 11 wherein the computer-readable instructions are further configured to enable the computer system to implement the process of claim 9 when loaded and executed within the computer system.

15. A high dynamic range image editing system for editing a high dynamic range image data having pixels spanning a first range of light intensity levels, the high dynamic range image editing system comprising:
a scaling control operable by the user that allows the user to specify one of several scaling factors;
a scaler in communication with the scaling control configured to create a scaled version of the image data that has pixel intensity levels that are scaled from their original values in accordance with the scaling factor specified by the user on the scaling control;
a display configured to display the scaled version of the image data; and
an image editing sub-system configured to:
edit the image in accordance with a request received from a user by editing pixels in the scaled version of the image data in accordance with the request; and
update the high dynamic range image data with the edits that are made to the scaled version of the image data by replacing the value of each pixel in the high dynamic range image data that was edited in the scaled version of the image data with the edited value of the pixel in the scaled version of the image data, scaled inversely to the scaling factor specified by the user on the scaling control.

16. The high dynamic range image editing system of claim 15 wherein the scaler is configured to multiply the values of the pixels in the high dynamic range image data by the scaling factor specified by the user on the scaling control.

17. The high dynamic range image editing system of claim 16 wherein one of the several scaling factors is greater than one and one of the several scaling factors is less than one.

18. The high dynamic range image editing system of claim 15 further including a lookup table which maps pixel intensity values to adjusted pixel intensity values in accordance with a non-linear mapping curve.

19. The high dynamic range image editing system of claim 18 wherein the lookup table only maps pixel intensity values for the high order bits of words that store pixel intensity values, rather than all possible pixel intensity values.

20. A high dynamic range image editing process for editing an image contained within a high dynamic range image data having pixels spanning a first range of light intensity levels, the high dynamic range image editing process comprising:

a scaling control receiving one of several scaling factors specified by a user on the scaling control;

a scaler creating a scaled version of the image data that has pixel intensity levels that are scaled from their original values in accordance with the scaling factor specified by the user on the scaling control;

a display displaying the scaled version of the image data an image editing sub-system within the computer system:
  editing the image in accordance with a request received from a user by editing pixels in the scaled version of the image data in accordance with the request;
  updating the high dynamic range image data with the edits that are made to the scaled version of the image data by replacing the value of each pixel in the high dynamic range image data that was edited in the scaled version of the image data with the edited value of the pixel in the scaled version of the image data, scaled inversely to the scaling factor specified by the user on the scaling control.

21. The high dynamic range image editing process of claim 20 wherein the creating a scaled version multiplies the values of the pixels in the high dynamic range image data by the scaling factor specified by the user on the scaling control.

22. The high dynamic range image editing process of claim 21 wherein one of the several scaling factors is greater than one and one of the several scaling factors is less than one.

23. The high dynamic range image editing process of claim 20 further including looking up pixel intensity values in a lookup table to obtain their adjusted pixel intensity values that correspond to a non-linear mapping curve.

24. The high dynamic range image editing process of claim 23 wherein the lookup table only maps pixel intensity values for the high order bits of words that store pixel intensity values, rather than all possible pixel intensity values.

25. Non-transitory, tangible, computer-readable storage media containing computer-readable programming instructions configured to enable a computer system to implement the process of claim 20 when loaded and executed within the computer system.

26. The computer-readable storage media of claim 25 wherein the computer-readable instructions are further configured to enable the computer system to implement the process of claim 21 when loaded and executed within the computer system.

27. The computer-readable storage media of claim 26 wherein the computer-readable instructions are further configured to enable the computer system to implement the process of claim 22 when loaded and executed within the computer system.

28. The computer-readable storage media of claim 25 wherein the computer-readable instructions are further configured to enable the computer system to implement the process of claim 23 when loaded and executed within the computer system.

* * * * *